R. T. NEWTON.
GAGE.
APPLICATION FILED DEC. 30, 1918.
1,396,655.
Patented Nov. 8, 1921.
2 SHEETS—SHEET 2.
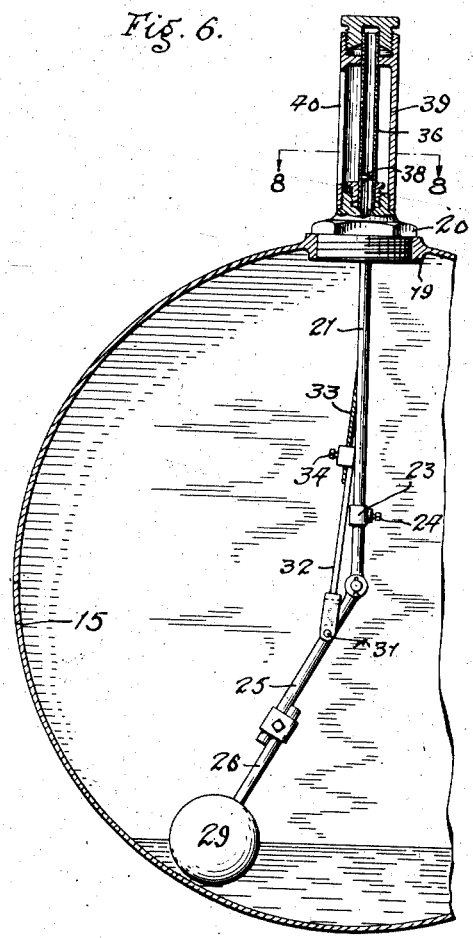
Fig. 6.
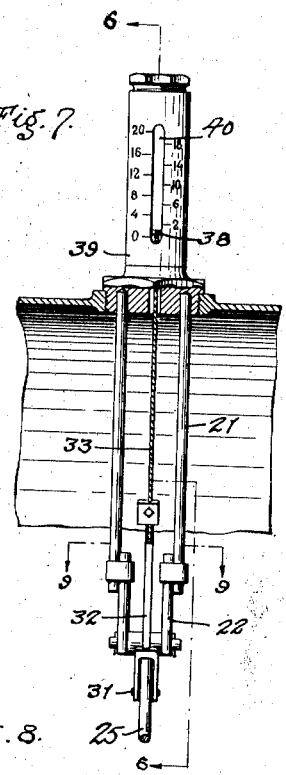
Fig. 7.
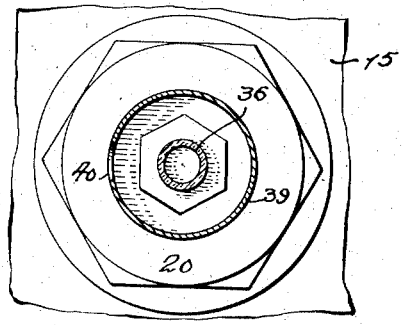
Fig. 8.
Fig. 9.
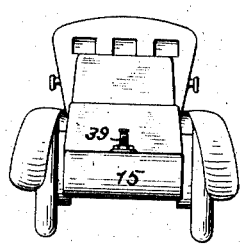
Fig. 10.
Inventor
RICHARD T. NEWTON
By his Attorneys
Howson and Howson

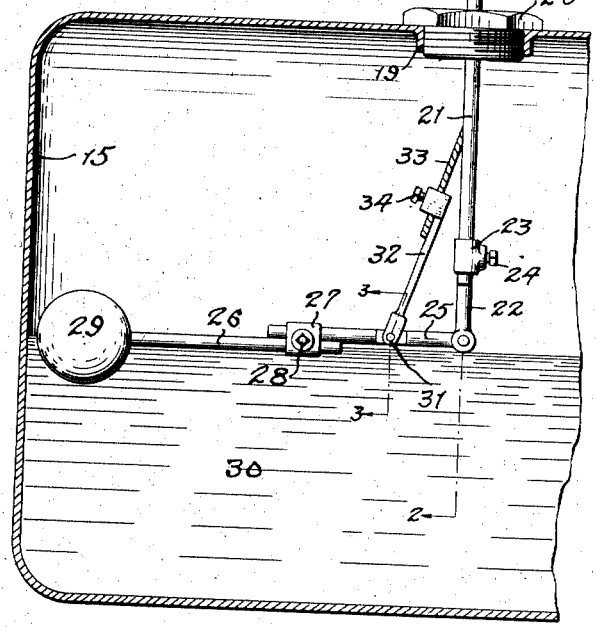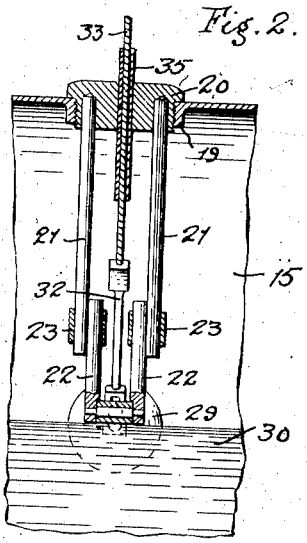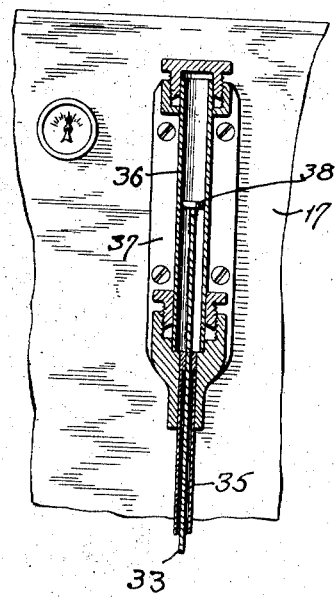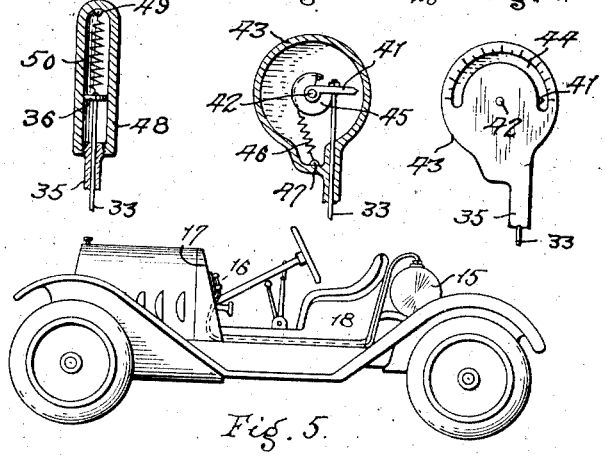

UNITED STATES PATENT OFFICE.

RICHARD T. NEWTON, OF NEW YORK, N. Y.

GAGE.

1,396,655.  Specification of Letters Patent.  Patented Nov. 8, 1921.

Application filed December 30, 1918. Serial No. 268,907.

*To all whom it may concern:*

Be it known that I, RICHARD T. NEWTON, a citizen of the United States of America, and residing in the city, county, and State of New York, have invented a certain new and Improved Gage, of which the following is a specification.

My invention relates to gages, and particularly to liquid level gages; the object of my invention being to provide a gage for automobile fuel tanks and radiator tanks, and the like.

In the accompanying drawings—

Figure 1— is a broken section through a gasolene tank showing the float and the gage operating connection.

Fig. 2— is a section on the line 2—2 of Fig. 1.

Fig. 3— is a section on the line 3—3 of Fig. 1.

Fig. 4— is a vertical section through the gage mounted on the dash board of an automobile.

Fig. 5— is a side elevation of an automobile, indicating the location of the gage with relation to the gasolene tank.

Fig. 6— is a transverse section through a tank showing the gage mounted directly thereon.

Fig. 7— is a section at right angles thereto, showing the gage in side elevation.

Fig. 8— is a section on the line 8—8 Fig. 6.

Fig. 9— is a section on the line 9—9 Fig. 7.

Fig. 10— is a rear elevation of an automobile showing the position of the gage on a gasolene tank at the rear thereof.

Fig. 11— is an elevation of a modified construction of the indicator.

Fig. 12— is a section therethrough.

Fig. 13— is a vertical section through a modified construction of the indicator.

While the present gage may be utilized in connection with various other systems, I have illustrated it for use in connection with an automobile and utilized to indicate the level of the fuel in the fuel tank. The general arrangement is shown in Fig. 5 wherein the tank 15 is located at the rear of the automobile, while the gage 16 is mounted upon the dash 17 in front of the driver's seat 18.

The tank is shown on a larger scale in Fig. 1, and as will be seen therefrom, has a flanged opening 19 tapped to receive a screw bushing 20. The latter carries a frame comprising a pair of rods 21, extended at their lower ends by a complementary pair of rods 22 adjustably secured to the rods 21 by a sleeve 23 and set screw 24. At the lower ends of the rods 22 is pivoted an arm 25 extended at its outer end by a complementary rod 26 adjustably attached thereto by a sleeve 27 and a set screw 28. At the free end of the rod 26 is attached the tank float 29 which rests upon the liquid 30 in the tank. Pivoted at 31 to the rod 25 is a link 32 to which one end of a flexible connector 33 is adjustably attached by a set screw 34. Passing into the tank through the bushing 20, is one end of a guide tube 35, and the flexible connector 33 passes therethrough to the gage indicator on the dash board.

On the dash 17 is mounted in convenient position for observation by the driver, the gage casing 36 carried by a bracket 37 and opening at its lower end to the guide tube 35. The flexible connector 33 enters the gage casing 36 and carries at its end an indicator 38 of any suitable type. In the construction here shown, the gage casing 36 is of glass and the indicator 38 is visible therethrough. Obviously, as the tank float 29 rises and falls with a variation of the liquid level in the tank 15, its motion is transmitted through the flexible connector 33 to the gage indicator 38 and the driver of the car is able to see at a glance, the condition of the fuel supply in the tank 15 by observing the position of the indicator 38 in the gage casing 36. The flexible connector 33 may be of any suitable type, but I have found most suitable a Bowden wire, or the like. It will be observed that the position of the indicator 38 in the gage housing 36 may be readily varied by adjusting its connection to the link 32, while the length of the float arm, as well as that of the frame, may be adjusted to various sizes of tanks by manipulation of the set screws 28 and 24 respectively.

In the modified construction shown in the Figs. 6 to 10 inclusive, the construction of the float and operating connections is substantially the same except that I have shown the gage housing 39 of metal with slot 40 through which the indicator 38 may be seen. In this construction also I have mounted the gage directly upon the bushing 20 in the tank 15, rather than on the dash, should this arrangement be preferred.

In Figs. 11 and 12 I have shown another modification in which the indicator comprises an arm 41, which is mounted on a spindle 42 supported in the housing 43, which is slotted at 44, to permit the tip of the indicator arm 41 to be seen therethrough. The flexible connector 33 is secured to one side of the pulley 45 fastened to the spindle 42 and to the opposite side of which is secured one end of a balancing spring 46 anchored at 47 to the casing. In this construction the float instead of operating as a pusher, operates as a pull member acting against the spring 46 with the result that the flexible connector 33 is maintained in tension so that there is no slack. This minimizes the friction in the guide tube and in fact permits the substitution of a chain, cord or similar flexible connector in place of a Bowden wire. Moreover the spring 46 helps to relieve the dead weight of the float, so that a lighter one may be used. Moreover the instrument as a whole is rendered more sensitive.

In Fig. 13 I have shown the same thought applied to a rectilinearly moving indicator of the type indicated in Figs. 1 to 10. In this case the flexible connector 33 passes into a tubular housing 48 to the opposite end of which is secured at 49 one end of the counter-spring 50, the opposite end of which is attached to the indicator head 36 at the end of the flexible connector 33.

Obviously the indicator of Figs. 11, 12 and 13 may be applied with equal readiness either to the tank itself or mounted on the dash, as may be preferred.

Various modifications in detail of arrangement and construction of the parts will readily occur to those skilled in the art without departing from what I claim as my invention.

I claim—

1. In a tank gage, a tank frame comprising a pair of spaced standards, a second pair of spaced standards adjustably secured thereto, a float lever pivoted between the lower ends of said adjustable standards, a link pivoted to said float lever, a flexible gage wire adjustably clamped to said link, and a guide tube arranged between said first mentioned pair of standards and through which the gage wire is led from the tank and an indicator controlled by said gage wire.

2. In a tank gage, a tank frame comprising a pair of spaced standards, a second pair of spaced standards adjustably secured thereto, a float lever pivoted between the lower ends of said adjustable standards, a link pivoted to said float lever, a flexible gage wire adjustably clamped to said link, and a guide tube arranged between said first mentioned pair of standards and through which the gage wire is led from the tank, in combination with a gage casing, an indicator therein, and a spring associated therewith and serving to counterbalance the drag of the gage wire and float and thus to render the indicator more sensitive, substantially as described.

In testimony whereof I have signed my name to this specification.

RICHARD T. NEWTON.